United States Patent  (10) Patent No.: US 8,830,897 B2
Ding et al.  (45) Date of Patent: Sep. 9, 2014

(54) NETWORK HANDOVER METHOD, COMMUNICATIONS SYSTEM, AND RELEVANT DEVICES

(75) Inventors: Zhiming Ding, Shenzhen (CN); Yongli Yang, Shenzhen (CN); Guiming Shu, Shenzhen (CN)

(73) Assignee: Huawei Device Co., Ltd. (CN)

( * ) Notice: Subject to any disclaimer, the term of this patent is extended or adjusted under 35 U.S.C. 154(b) by 195 days.

(21) Appl. No.: 12/829,215

(22) Filed: Jul. 1, 2010

(65) Prior Publication Data

US 2011/0002302 A1 Jan. 6, 2011

(30) Foreign Application Priority Data

Jul. 3, 2009 (CN) .......................... 2009 1 0150115
Apr. 1, 2010 (WO) ................ PCT/CN2010/071507

(51) Int. Cl.
*H04L 12/28* (2006.01)
*H04W 76/04* (2009.01)
*H04W 36/00* (2009.01)

(52) U.S. Cl.
CPC ........ *H04W 76/041* (2013.01); *H04W 36/0033* (2013.01)
USPC ...................................................... 370/315

(58) Field of Classification Search
None
See application file for complete search history.

(56) References Cited

U.S. PATENT DOCUMENTS 7,411,922 B1* 8/2008 Savunen ........................ 370/328
2004/0066769 A1* 4/2004 Ahmavaara et al. .......... 370/338
2006/0046728 A1 3/2006 Jung et al.
2007/0127444 A1 6/2007 Gras et al.
2008/0259869 A1 10/2008 Wang et al.

FOREIGN PATENT DOCUMENTS

| CN | 101035049 A | 9/2007 |
|----|----|----|
| CN | 101299717 A | 11/2008 |
| CN | 101365248 A | 2/2009 |
| RU | 2007107085 A | 9/2008 |
| WO | 2008115757 A1 | 9/2008 |

OTHER PUBLICATIONS

Partial Translation of Office Action dated Dec. 15, 2011 in connection with Chinese Patent Application No. 200910150115.8.
International Search Report dated Jul. 8, 2010 in connection with International Patent Application No. PCT/CN2010/071507.
Written Opinion of the International Searching Authority dated Jul. 8, 2010 in connection with International Patent Application No. PCT/CN2010/071507.
"WiFi-WiMax Interworking, Version 0.03", WiMax Forum Proprietary, 2009, 30 pages.
Partial Translation of Rejection Decision dated Jun. 4, 2012 in connection with Chinese Patent Application No. 200910150115.8.

(Continued)

*Primary Examiner* — Raj Jain
(74) *Attorney, Agent, or Firm* — Huawei Device Co., Ltd.

(57) ABSTRACT

A network handover method, a communications system, and relevant devices are provided, so as to implement handover between a Wireless Fidelity (WiFi) network and a Worldwide Interoperability for Microwave Access (WiMAX) network. The method specifically includes the following steps. A user terminal determines a target network access point (AP) and acquires a tunnel destination address. A signaling transmission tunnel between the user terminal and the target network AP is established through a current network according to the tunnel destination address. The user terminal executes a network access operation with the target network AP through the signaling transmission tunnel. The communications system and the relevant devices are further provided. Thus, the handover between the WiFi network and the WiMAX network can be implemented.

4 Claims, 6 Drawing Sheets

(56) References Cited

OTHER PUBLICATIONS

Notice of allowance issued in corresponding American patent application No. 13604069, dated Nov. 14, 2012, total 10 pages.
Third office action issued in corresponding Chinese patent application 200910150115.8, dated Jun. 4, 2013, and English translation thereof, total 12 pages.
First office action issued in corresponding Russia patent application 2011111933, dated Feb. 28, 2013, and English translation thereof, total 8 pages.
Second office action issued in corresponding Chinese patent application 200910150115.8, dated Feb. 5, 2013, and English translation thereof, total 8 pages.
Search report issued in corresponding Chinese patent application 200910150115.8, dated Oct. 18, 2011, and English translation thereof, total 12 pages.
First office action issued in corresponding Japanese patent application 2012-518008, dated Jan. 29, 2013, and English translation thereof, total 6 pages.
Notice of Allowance issued in corresponding Russian patent application 2011111933, dated May 22, 2013, and English translation thereof, total 23 pages.
Rejection decision issued in corresponding Japanese patent application 2012-518008, dated Aug. 6, 2013, and English translation thereof, total 4 pages.

* cited by examiner

NETWORK HANDOVER METHOD, COMMUNICATIONS SYSTEM, AND RELEVANT DEVICES

CROSS-REFERENCE TO RELATED APPLICATIONS

The application claims priority to Chinese Patent Application No. 200910150115.8, filed on Jul. 3, 2009, and International Patent Application No. PCT/CN2010/071507, filed on Apr. 1, 2010, both of which are hereby incorporated by reference in their entireties.

TECHNICAL FIELD

The present invention relates to the field of communications, and more particularly to a network handover method, a communications system, and relevant devices.

BACKGROUND

With the development of network technology, various types of new networks continuously occur, for example, a Wireless Fidelity (WiFi) network and a Worldwide Interoperability for Microwave Access (WiMAX) network.

Both the WiFi and the WiMAX are important wireless broadband access technologies, but each has advantages and disadvantages. For the WiFi, network layout is fast, cost is low, a bandwidth is high, a spectrum can be used without authorization, but coverage is small. WiMAX has large coverage, but many users exist in the large coverage and an average user bandwidth is reduced. Therefore, it is recently researched to use the WiFi as a supplement for the WiMAX and use a WiFi access point (AP) at places having a weak WiMAX signal or being populous.

Thus, a problem of handover of a user terminal between the WiFi network and the WiMAX network is involved. A part of existing user terminals support double-radio frequency handover. During the handover of the part of the user terminals, two radio frequency circuits work at the same time. One radio frequency circuit communicates in a current network and the other radio frequency circuit performs a network access operation in a target network, so as to implement seamless handover.

However, for user terminals that do not support the double-radio frequency handover but only support single-radio frequency handover, in order to ensure to implement seamless handover, a common handover mode in the prior art is described in the following.

Firstly, a virtual AP is deployed in a public network. A user terminal establishes a tunnel with the virtual AP through an AP in a current network and executes a handover operation with the virtual AP through the tunnel, that is, the user terminal accesses the network from an air interface of a target network. After entering the target network, the user terminal is handed over from the virtual AP to a real AP of the target network (that is, intra-network handover), and thus network handover is implemented eventually.

However, the AP in the current WiFi network does not support a roaming function and a procedure of handover from one WiFi network AP to another WiFi network AP is unable to be completed, so that the intra-network handover in the existing handover method is not applicable to the WiFi network.

SUMMARY

The present invention is directed to a network handover method, a communications system, and relevant devices, so as to implement handover between a Wireless Fidelity (WiFi) network and a Worldwide Interoperability for Microwave Access (WiMAX) network.

In an embodiment, the present invention provides a network handover method, which includes the following steps. A user terminal determines a target network access point (AP) and acquires a tunnel destination address. A signaling transmission tunnel between the user terminal and the target network AP is established through a current network according to the tunnel destination address. The user terminal executes a network access operation with the target network AP through the signaling transmission tunnel.

In an embodiment, the present invention provides a communications system, which includes a target network AP and a current network. The target network AP is configured to establish a signaling transmission tunnel with a user terminal and execute a network access operation with the user terminal through the signaling transmission tunnel. The current network is configured to assist in establishing the signaling transmission tunnel between the target network AP and the user terminal.

In an embodiment, the present invention provides a communications system, which includes a target network access controller (AC), a current network, and a target network AP. The target network AC is configured to establish a first signaling transmission tunnel with a user terminal and determine an existing second signaling transmission tunnel with the target network AP or establish the second signaling transmission tunnel with the target network AP. The current network is configured to assist to establish the first signaling transmission tunnel. The target network AP is configured to execute a network access operation with the user terminal through the first signaling transmission tunnel and the second signaling transmission tunnel.

In an embodiment, the present invention provides a communications system, which includes a signaling forwarding entity, a current network, and a target network AP. The signaling forwarding entity is configured to establish a first signaling transmission tunnel with a user terminal and determine an existing second signaling transmission tunnel with the target network AP or establish a second signaling transmission tunnel with the target network AP. The current network is configured to assist in establishing the first signaling transmission tunnel. The target network AP is configured to execute a network access operation with the user terminal through the first signaling transmission tunnel and the second signaling transmission tunnel.

In an embodiment, the present invention provides a communications system, which includes a signaling forwarding entity, a target network AC, a current network, and a target network AP. The signaling forwarding entity is configured to establish a first signaling transmission tunnel with a user terminal and determine an existing second signaling transmission tunnel with the target network AC or establish a second signaling transmission tunnel with the target network AC. The target network AC is configured to establish the second signaling transmission tunnel with the signaling forwarding entity and determine an existing third signaling transmission tunnel with the target network AP or establish the third signaling transmission tunnel with the target network AP. The current network is configured to assist in establishing the first signaling transmission tunnel. The target network AP is configured to execute a network access operation with the user terminal through the first signaling transmission tunnel, the second signaling transmission tunnel, and the third signaling transmission tunnel.

In an embodiment, the present invention provides a user terminal, which includes a tunnel information acquiring unit, a tunnel establishment unit, and a tunnel network access control unit. The tunnel information acquiring unit is configured to acquire a tunnel destination address according to a detected target network AP. The tunnel establishment unit is configured to establish a signaling transmission tunnel with a network element (NE) corresponding to the tunnel destination address through a current network according to the tunnel destination address. The tunnel network access control unit is configured to execute a network access operation with the target network AP through the signaling transmission tunnel.

In an embodiment, the present invention provides a network AC, which includes a first tunnel establishment unit, a packet processing unit, and a second tunnel establishment unit. The first tunnel establishment unit is configured to establish a first signaling transmission tunnel with a user terminal. The packet processing unit is configured to receive an air interface packet carrying a media access control (MAC) address of a target network AP sent by the user terminal and forward the air interface packet between the first signaling transmission tunnel and a second signaling transmission tunnel. The second tunnel establishment unit is configured to determine an existing second signaling transmission tunnel with the target network AP or establish the second signaling transmission tunnel with the target network AP according to the MAC address of the target network AP.

In an embodiment, the present invention provides a network AC, which includes a fifth tunnel establishment unit, a third packet processing unit, and a sixth tunnel establishment unit. The fifth tunnel establishment unit is configured to determine an existing second signaling transmission tunnel with a signaling forwarding entity or establish a second signaling transmission tunnel with the signaling forwarding entity. The third packet processing unit is configured to receive an air interface packet carrying an MAC address of a target network AP and forward the air interface packet between the second signaling transmission tunnel and a third signaling transmission tunnel. The sixth tunnel establishment unit is configured to determine an existing third signaling transmission tunnel with the target network AP or establish the third signaling transmission tunnel with the target network AP according to the MAC address of the target network AP.

In an embodiment, the present invention provides a signaling forwarding entity, which includes a third tunnel establishment unit, a second packet processing unit, and a fourth tunnel establishment unit. The third tunnel establishment unit is configured to establish a first signaling transmission tunnel with a user terminal. The second packet processing unit is configured to receive an air interface packet carrying an MAC address of a target network AP sent by the user terminal and forward the air interface packet between the first signaling transmission tunnel and a second signaling transmission tunnel. The fourth tunnel establishment unit is configured to determine an existing second signaling transmission tunnel with the target network AP or a target network AC or establish the second signaling transmission tunnel with the target network AP or the target network AC.

In an embodiment, the present invention provides a network AP, which includes a seventh tunnel establishment unit and a fourth packet processing unit. The seventh tunnel establishment unit is configured to establish a signaling transmission tunnel with a user terminal or a target network AC or a signaling forwarding entity. The fourth packet processing unit is configured to receive an air interface packet sent by the user terminal through the signaling transmission tunnel established by the seventh tunnel establishment unit and send the air interface packet to the user terminal through the signaling transmission tunnel established by the seventh tunnel establishment unit.

As can be seen from the foregoing technical solutions, the embodiments of the present invention have the following advantages.

In the embodiments of the present invention, the user terminal establishes the signaling transmission tunnel with the target network AP through the current network and executes the network access operation with the target network AP through the signaling transmission tunnel. In this way, the user terminal does not need to establish a tunnel with a virtual AP and then perform an intra-network handover, so that for the network that does not support a roaming function, for example, the WiFi network, the handover between the WiFi network and the WiMAX network can be implemented.

Next, in the embodiments of the present invention, the user terminal executes the network access operation with the target network AP through the signaling transmission tunnel without performing the intra-network handover, and thus time required for the handover procedure is saved and network handover efficiency is increased.

DETAILED DESCRIPTION

In an embodiment, the present invention provides a network handover method, a communications system, and relevant devices, which are used for implementing handover between a Wireless Fidelity (WiFi) network and a Worldwide Interoperability for Microwave Access (WiMAX) network.

Figure 1:
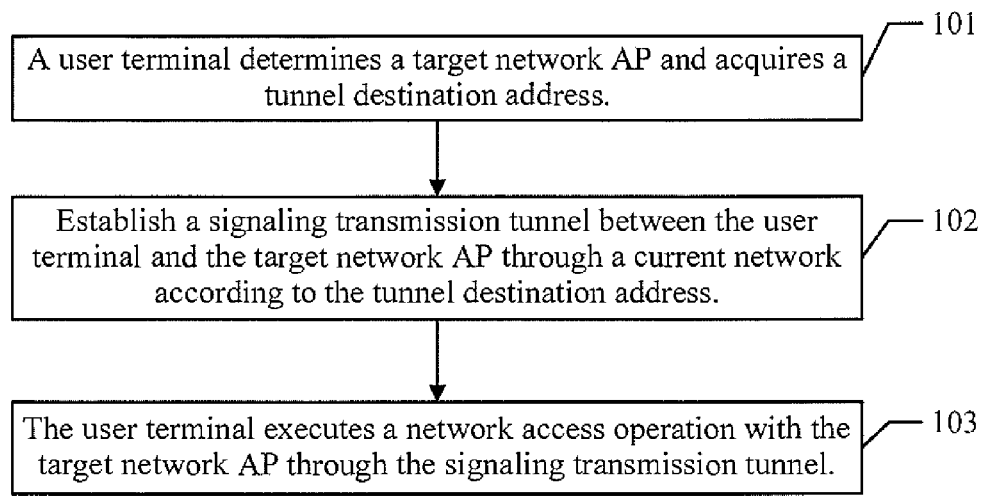
FIG. 1 is a schematic view of a network handover method according to an embodiment of the present invention.

Referring to FIG. 1, a network handover method according to an embodiment of the present invention includes the following steps.

In step 101, a user terminal determines a target network access point (AP) and acquires a tunnel destination address.

In this embodiment, the user terminal may detect the target network AP through detecting at a region crossly covered by a current network and a target network. A specific detecting procedure is general knowledge for persons skilled in the art, for example, the target network AP may perform broadcast in the coverage of the target network AP, so as to be detected by the user terminal, or other modes of finding the target network AP may be adopted, which is not specifically described here.

When the user terminal detects that a signal of the current network is weak and a signal of the target network is good, or the user intends to hand over to the target network, or due to other reasons, the user terminal requests to hand over from the current network to the target network.

After determining to perform the network handover, the user terminal needs to establish a signaling transmission tunnel. Before establishing the signaling transmission tunnel, the user terminal needs to acquire a destination address of the signaling transmission tunnel, so that the user terminal acquires a tunnel destination address. A tunnel destination refers to the other end of the tunnel relative to a network element (NE) requesting to establish the tunnel and the NE requesting to establish the tunnel is regarded as a starting point of the tunnel, for example, the user terminal here. However, the established tunnel is a bi-directional tunnel, that is, two end points of the tunnel use the same tunnel to send a packet to each other and receive a packet from each other. The definitions of the tunnel destination and the tunnel are the same as the description here, which are no longer repeated. A specific mode of acquiring the tunnel destination address and a definition represented by the tunnel destination address are described in detail in subsequent embodiments.

In step 102, the signaling transmission tunnel between the user terminal and the target network AP is established through the current network according to the tunnel destination address.

After acquiring the tunnel destination address, the user terminal establishes the signaling transmission tunnel with the target network AP according to the tunnel destination address. A starting point of the signaling transmission tunnel is the user terminal and the signaling transmission tunnel is established through the current network of the user terminal, that is to say, the established tunnel passes through the current network connected to the terminal.

It should be noted that the signaling transmission tunnel between the user terminal and the target network AP in this embodiment may be a direct tunnel between the user terminal and the target network AP or may also be an indirect tunnel with the target network AP established by the user terminal through one or more transit NEs, which is not specifically described here. However, the user terminal does not concern which NE the tunnel destination address belongs to and the user terminal only knows that the signaling transmission tunnel between the user terminal and the target network AP is established by establishing the tunnel with the NE having the tunnel destination address.

In step 103, the user terminal executes a network access operation with the target network AP through the signaling transmission tunnel.

After establishing the signaling transmission tunnel between the user terminal and the target network AP, the user terminal performs the network access operation with the target network AP through the signaling transmission tunnel.

In the embodiment of the present invention, the signaling transmission tunnel between the user terminal and the target network AP is established through the current network and the user terminal executes the network access operation with the target network AP through the signaling transmission tunnel, so that user terminal does not need to establish a tunnel with a virtual AP, enter the network through the virtual AP, and then perform intra-network handover, so that for the network that does not support a roaming function, for example, the WiFi network, the handover between the WiFi network and the WiMAX network can be implemented.

Next, in the embodiment of the present invention, the user terminal executes the network access operation with the target network AP through the signaling transmission tunnel without performing the intra-network handover, and thus time required by the handover procedure is saved and network handover efficiency is increased.

For ease of understanding, different tunnel destination addresses are described in the following.

I. The Tunnel Destination Address is an Internet Protocol (IP) Address of a WiFi Network AP being Addressable for the User Terminal.

Figure 3:
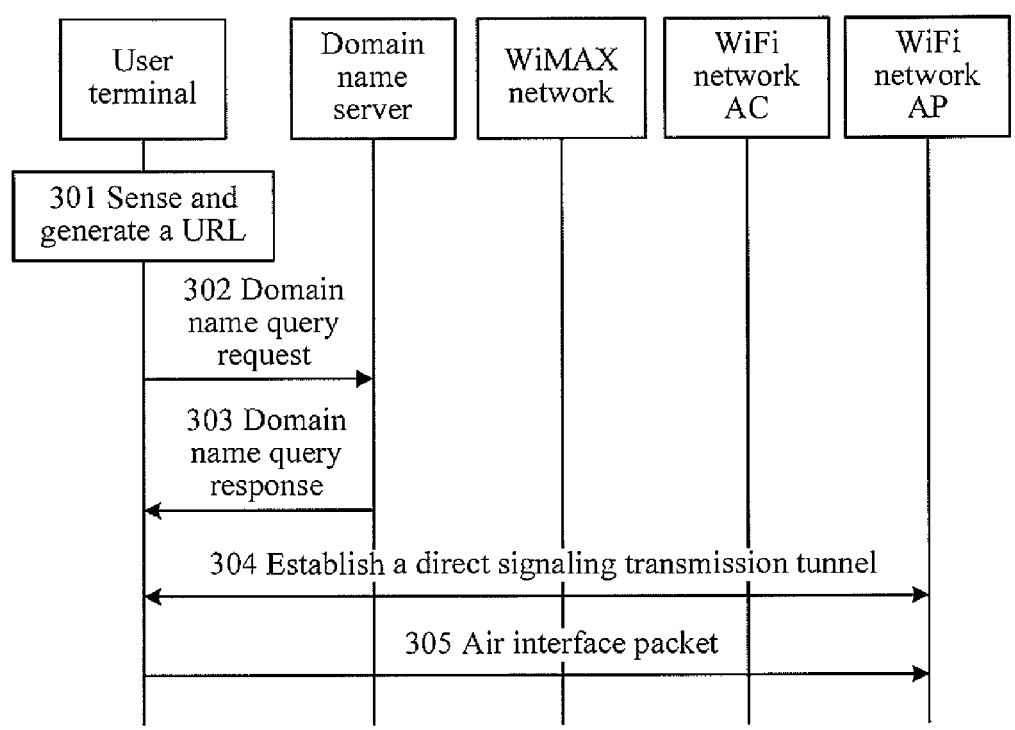
FIG. 3 is a schematic view of network handover according to another embodiment of the present invention.

Referring to FIG. 3, a network handover method according to another embodiment of the present invention includes the following steps.

In step 301, a user terminal generates a uniform resource locator (URL).

In this embodiment, when the user terminal detects a WiFi network AP and requests to be handed over from a WiMAX network to a WiFi network, the user terminal needs to establish a signaling transmission tunnel, so that the user terminal needs to request to acquire a tunnel destination address.

In this embodiment, for example, the WiMAX network serves as a current network and the WiFi network serves as a target network. It should be understood that during practical application, according to technical features of the present invention, as long as a signaling MAC frame of the target network includes an MAC address or identification information of a target network AP, the technology of the embodiment of the present invention may be used, so that the target network and the current network are not specifically limited in the embodiment of the present invention.

The user terminal acquires the MAC address of the WiFi network AP according to the detected WiFi network AP and generates the URL according to the MAC address or other unique information of the WiFi network AP. Specifically, the other unique information may also be the identification information of the WiFi network AP, that is, an ID of the WiFi network AP.

During practical application, a format of the URL may be "AP identification.access network operator name.com", where the "AP identification" may be replaced by a string converted from the MAC address or other identifications of the WiFi network AP and the "AP identification" is unique. The "access network operator name" is acquired by the user terminal from broadcast information of the WiFi network AP when detecting the WiFi network AP. The information may be optional information and may be not carried during the practical application, or is combined with the "AP identification" into a string.

In step 302, the user terminal sends a domain name query request to a domain name server.

After generating the URL, the user terminal may send the domain name query request carrying the generated URL to the domain name server, so as to request to acquire the tunnel destination address.

In step 303, the domain name server returns a domain name query response to the user terminal.

After receiving the domain name query request sent by the user terminal, the domain name server queries an IP address corresponding to the URL and sends the IP address to the terminal in a query response message.

In this embodiment, the WiFi network AP is configured with an addressable IP address, so that the IP address corresponding to the URL configured on the domain name server is the IP address of the WiFi network AP.

In step 304, the user terminal establishes a direct signaling transmission tunnel with the WiFi network AP.

After receiving the IP address returned by the domain name server, the user terminal establishes the tunnel with the WiFi network AP by using the IP address as the tunnel destination address. Practically, the user terminal does not know that the tunnel destination is the WiFi network AP. In this embodiment, the destination of the direct signaling transmission tunnel is the WiFi network AP and the direct signaling transmission tunnel passes through the WiMAX network and possibly passes through a WiFi network AC.

It should be noted that if the WiFi network AP integrates a function of a controller, the WiFi network may not have the WiFi network AC and the user terminal may establish the direct signaling transmission tunnel with the WiFi network AP without using the WiFi network AC.

In this embodiment, after the starting point and the destination of the tunnel are determined, the procedure of establishing the direct signaling transmission tunnel is general knowledge for persons skilled in the art, which is not specifically described here.

In step 305, the user terminal sends an air interface packet to the WiFi network AP.

After completing establishing the direct signaling transmission tunnel, the user terminal sends the air interface packet to the WiFi network AP through the direct signaling transmission tunnel and receives the air interface packet from the WiFi network AP through the direct signaling transmission tunnel. The air interface packet may be an IEEE802.11 MAC frame in this embodiment. If the target network is another network, the air interface packet is a packet of an air interface protocol used in the practical target network. The definitions of the air interface packets in subsequent embodiments are the same, which are no longer described repeatedly.

When receiving the first air interface packet sent by the user terminal from the tunnel, the WiFi network AP starts to execute a network access operation with the user terminal through the tunnel. The specific network access operation for the WiFi network includes the following procedures.

(1) 802.11 open authentication;
(2) 802.11 association operation; and
(3) 802.1x authentication or other authentication methods.

In step (3), the user terminal negotiates with an authentication server located in the core network to generate a master session key (MSK) and the authentication server sends the MSK to an authenticator in the WiFi network.

(4) The user terminal negotiates with the authenticator in the WiFi network on the basis of the MSK to generate a master key (pairwise master key, PMK) between the terminal and the authenticator.

For the 802.1x protocol, the PMK is actually in the MSK, so that the authenticator only needs to read the PMK from the MSK without a practical negotiation procedure.

(5) The user terminal negotiates with the WiFi network AP on the basis of the PMK to generate a key (pairwise transient key, PTK) for the air interface communications between the user terminal and the WiFi network AP.

(6) 802.11 de-association operation.

According to the 802.11 protocol, the user terminal performs de-association with the WiFi network AP and the user terminal and the WiFi network AP still maintain an authenticated state, that is, the PMK is maintained. The PMK has a life time. As long as the life time does not expire, the PMK is maintained.

Step (6) is optional. The de-association enables the WiFi network AP to release resources temporarily. Here, the user terminal does not perform communication through the WiFi network AP, so that the WiFi network AP does not need to maintain the association resources.

It should be noted that, after completing the network access operation, the user terminal powers off a WiMAX transmitting circuit, and powers on a WiFi transmitting circuit.

After being handed over to the WiFi radio frequency, the user terminal performs an association or re-association operation with the WiFi network AP. According to the 802.11 protocol, during the association or the re-association, the originally maintained PTK needs to be deleted and the user terminal needs to renegotiate the PTK with the WiFi network AP. Then a connection establishing procedure of an IP layer is performed and the user terminal completes the handover procedure of the mobile IP by the user terminal itself or under assistance of the network.

In this embodiment, the WiFi network AP is configured with an IP address addressable for the terminal, so that the tunnel destination address is the IP address of the WiFi network AP and the user terminal may directly establish the signaling transmission tunnel with the WiFi network AP. For details, please refer to FIG. 2.

Figure 2:
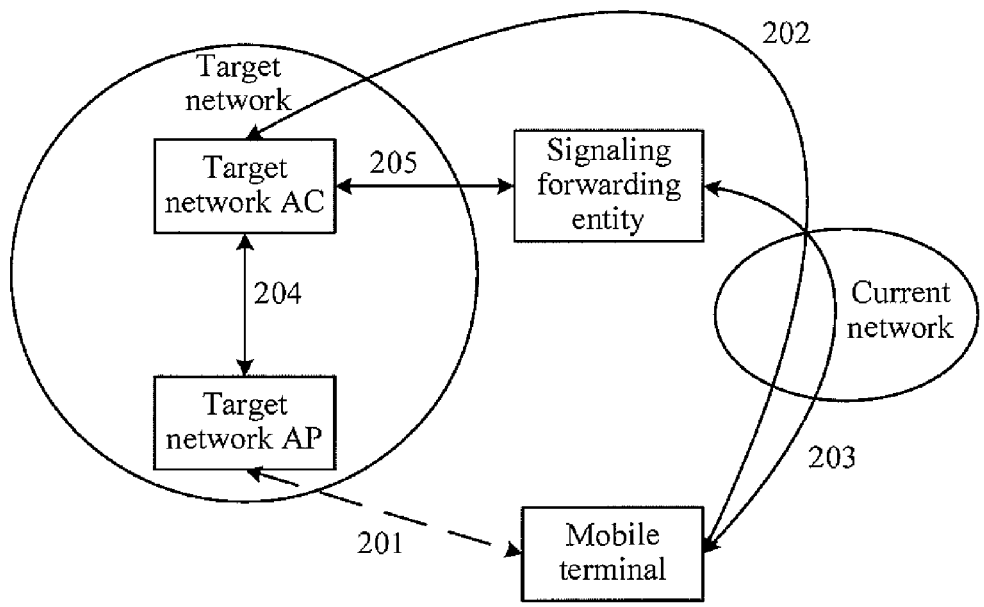
FIG. 2 is a schematic view of tunnel establishment according to an embodiment of the present invention.

If the user terminal supports double-radio frequency handover, the user terminal may be directly connected to the WiFi network through the WiFi air interface for interaction, that is, the air interface as shown by 201 in FIG. 2.

If the user terminal only supports single-radio frequency handover, when the user terminal is handed over from the WiMAX network to the WiFi network, the terminal sends via the tunnel a signaling message to the WiFi network AP through the WiMAX network, that is, where said tunnel is the tunnel formed of 202 and 204 in FIG. 2. Being an MAC message of the 802.11 protocol, the signaling message in the tunnel formed of 202 and 204 is completely the same as a signaling message of the air interface communication of 201. In order to pass through the WiMAX network and subsequent other network entities, an IP layer tunnel is established between the user terminal and the WiFi network AP, so that the MAC layer message of 802.11 is encapsulated in the message to be transferred.

In this embodiment, the WiFi network AP is configured with an IP address addressable on the public network, so that the tunnel formed of 202 and 204 passes through the WiMAX network (including a base station and a gateway in the WiMAX network) and the possibly existing WiFi network AC. At this time the WiMAX network and the WiFi network AC only serve as routing nodes. The WiFi network AC does not process the packet in the tunnel formed of 202 and 204. That is to say, 202 and 204 are one tunnel at this time and the tunnel just passes through the WiFi network AC on routing.

After the WiFi network AP receives the IP packet sent by the user terminal, the IP packet is an IP tunnel packet in which the 802.11 MAC frame is encapsulated, so that an MAC frame proxy module reads the encapsulated 802.11 MAC frame and delivers the 802.11 MAC frame to an 802.11 MAC frame processing module for subsequent processing.

In the embodiment, as the tunnel destination address acquired by the user terminal from the domain name server is the IP address of the WiFi network AP, the user terminal establishes the direct signaling transmission tunnel with the WiFi network AP and executes the network access operation with the WiFi network AP through the direct signaling transmission tunnel, so that the user terminal does not need to enter the network through a virtual AP and then perform intra-network handover. Therefore, for the network that does not support a roaming function, for example, the WiFi network, the handover between the WiFi network and the WiMAX network can be implemented.

Next, in the embodiment of the present invention, the user terminal directly executes the network access operation with the WiFi network AP through the direct signaling transmission tunnel without performing the intra-network handover, and thus time required by the handover procedure is saved, and network handover efficiency is increased.

II. The Tunnel Destination Address is the Addressable IP Address of the WiFi network AC.

Figure 4:
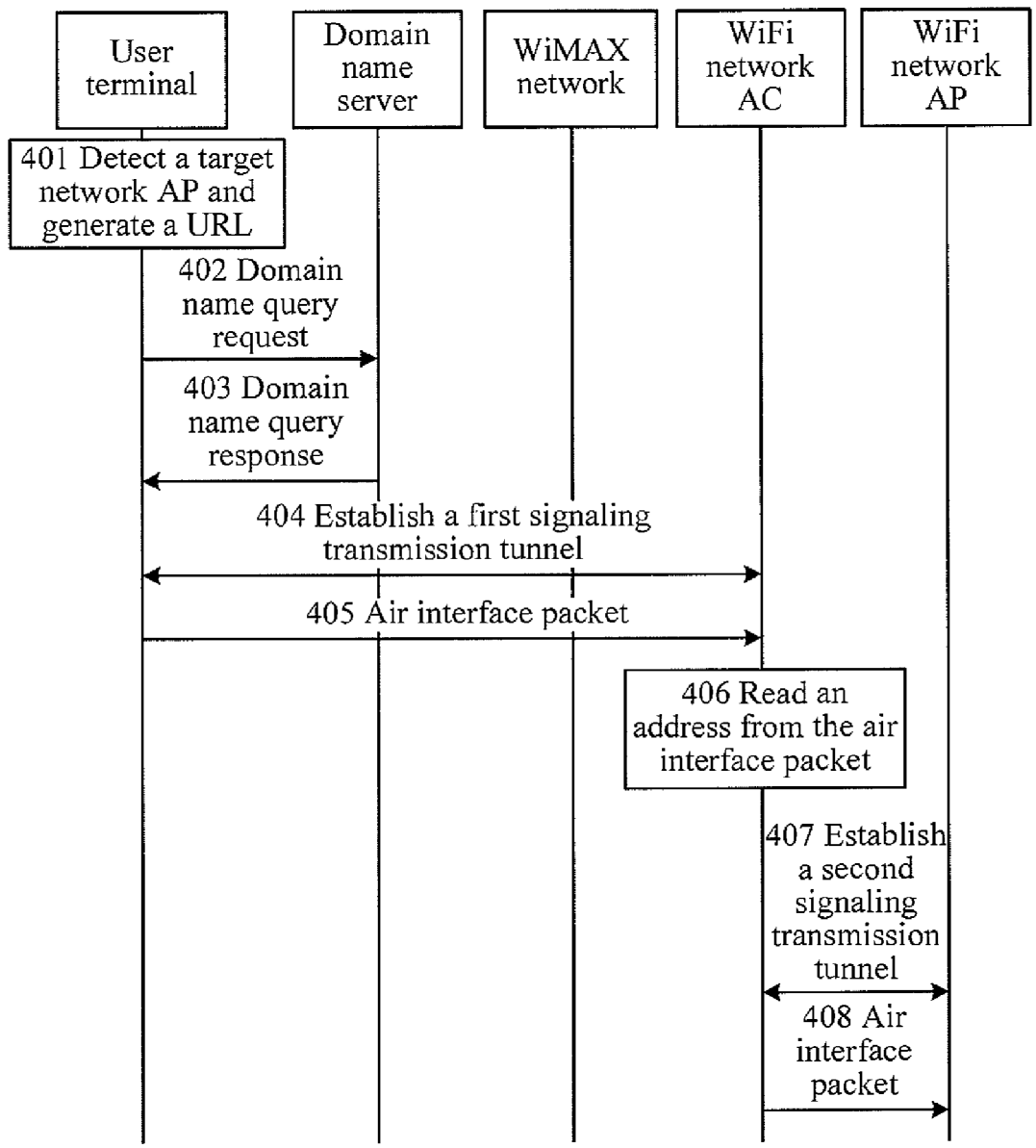
FIG. 4 is a schematic view of network handover according to another embodiment of the present invention.

Referring to FIG. 4, a network handover method according to another embodiment of the present invention includes the following steps.

In step 401, a user terminal detects a target network AP and generates a URL.

In this embodiment, the user terminal acquires an MAC address of a WiFi network AP according to the detected WiFi network AP and generates the URL according to the MAC address or other unique information of the WiFi network AP. A specific generating mode is consistent with step 301 in the embodiment as shown in FIG. 3, the description of which is not specifically described here.

In step 402, the user terminal sends a domain name query request to a domain name server.

Step 402 in this embodiment is consistent with step 302 in the embodiment as shown in FIG. 3, the description of which is not specifically described here.

In step 403, the domain name server returns a domain name query response to the user terminal.

After receiving the domain name query request sent by the user terminal, the domain name server reads the URL and sends an IP address corresponding to the URL to the terminal in a response message.

In this embodiment, the WiFi network AP is in a private intra-network, so that the user terminal cannot address the WiFi network AP through an IP network. However, a WiFi network AC of the network where the WiFi network AP is located has an IP address addressable for the terminal, so that the IP corresponding to the URL is the IP address of the WiFi network AC in the configuration of the domain name server.

In step 404, the user terminal establishes a first signaling transmission tunnel with the WiFi network AC.

After receiving the IP address returned by the domain name server, the user terminal establishes the first signaling transmission tunnel with the WiFi network AC through the WiMAX network according to the tunnel destination address used as the IP address.

It should be noted that the user terminal does not know that the IP address acquired through a domain name resolution protocol is the address of the AC and the user terminal only needs to establish the tunnel with the acquired IP address. However, in this situation, the procedure of establishing all the tunnels from the user terminal to the WiFi network AP is different.

In this embodiment, after a starting point and a destination of the tunnel are determined, a procedure of establishing the signaling transmission tunnel is general knowledge for persons skilled in the art, which is not specifically described here.

In step 405, the user terminal sends an air interface packet to the WiFi network AP.

After completing establishing the first signaling transmission tunnel, the user terminal sends the air interface packet to the WiFi network AP through the first signaling transmission tunnel.

The user terminal does not need to know whether the tunnel leads to the WiFi network AP. As long as the user terminal establishes the tunnel with the queried tunnel destination address, the user terminal sends a first air interface packet required by network access to the signaling transmission tunnel. A destination of the air interface packet is the WiFi network AP, that is, the user terminal requests to send the air interface packet to the WiFi network AP without concerning what approach of reaching the WiFi network AP by the air interface packet.

In this embodiment, the air interface packet includes the MAC address of the WiFi network AP. The MAC address is acquired by the user terminal when the WiFi network AP is detected in step 401.

In step 406, the WiFi network AC reads the address from the air interface packet.

After receiving the air interface packet from the first signaling transmission tunnel, the WiFi network AC reads the MAC address of the WiFi network AP from the air interface packet.

In step 407, the WiFi network AC establishes a second signaling transmission tunnel with the WiFi network AP.

After acquiring the MAC address of the WiFi network AP from the air interface packet, the WiFi network AC determines, according to the MAC address of the WiFi network AP, whether the WiFi network AP is in a management range of the WiFi network AC. If the WiFi network AP is in a management range of the WiFi network AC, and the tunnel leading to the WiFi network AP is not established yet, the WiFi network AC requests to establish the second signaling transmission tunnel with the WiFi network AP.

It should be noted that the second signaling transmission tunnel may be a layer two tunnel, that is, an MAC tunnel, or may also be a layer three tunnel, that is, an IP tunnel, which is determined according to a communication mode adopted by the WiFi network AC and the WiFi network AP.

It should be noted that as an amount of APs in one WiFi network is limited and relatively fixed, in this embodiment, the second signaling transmission tunnel between the WiFi network AC and the WiFi network AP may be statically established, that is, the second signaling transmission tunnel pre-exists between the WiFi network AC and the WiFi network AP, so that in this embodiment, steps 406 and 407 no longer need to be performed, that is, the WiFi network AC does not need to establish the second signaling transmission tunnel with the WiFi network AP.

Till now, all the tunnels between the user terminal and the WiFi network AP are completely established.

In step 408, the WiFi network AC forwards the air interface packet.

After completing establishing all the tunnels, the WiFi network AC forwards the air interface packet, that is, forwards the air interface packet received from the first signaling transmission tunnel to the second signaling transmission tunnel, and forwards the air interface packet received from the second signaling transmission tunnel to the first signaling transmission tunnel. The forwarding described here is that a tunnel header is removed from the received tunnel packet, a header of another tunnel is encapsulated, and the packet is sent. The procedure is general knowledge for persons skilled in the art, detailed description of which is not specifically described here.

Through the tunnels, the user terminal may complete the network access operation with the target network AP. The specific network access operation is the same as the network access operation described in the embodiment of FIG. 3, the description of which is not specifically described here.

In this embodiment, as the WiFi network AC is configured with an addressable IP address, the tunnel destination address is the IP address of the WiFi network AC, so that the user terminal establishes the first signaling transmission tunnel with the WiFi network AC and the WiFi network AC establishes the second signaling transmission tunnel with the WiFi network AP. For details, please refer to FIG. 2.

The WiFi network AC may have the IP address addressable for the public network, so that the user terminal establishes the first signaling transmission tunnel 202 with the WiFi network AC. The WiFi network AC needs to implement a proxy function. After receiving the IP packet encapsulated with the 802.11MAC frame sent by the user terminal through the first signaling transmission tunnel 202, the WiFi network AC establishes the second signaling transmission tunnel 204 with the WiFi network AP or statically establishes the second signaling transmission tunnel 204 and forwards the 802.11MAC frame in the IP tunnel packet to the WiFi network AP through the second signaling transmission tunnel 204. The second signaling transmission tunnel 204 may adopt the IP tunnel or the double-layer tunnel, which is determined by the WiFi network AP and the WiFi network AC according to a practical network situation.

In this embodiment, the tunnel destination address acquired by the user terminal from the domain name server is the IP address of the WiFi network AC, so that the user terminal establishes the first signaling transmission tunnel with the WiFi network AC and the WiFi network AC establishes the second signaling transmission tunnel with the WiFi network AP or uses the statically established second signaling transmission tunnel. The user terminal may execute the network access operation with the WiFi network AP through the first signaling transmission tunnel and the second signaling transmission tunnel, so that the user terminal does not need to enter the network through a virtual AP and then perform an intra-network handover, so that for the network that does not support a roaming function, for example, the WiFi network, the handover between the WiFi network and the WiMAX network can be implemented.

Next, in the embodiment of the present invention, the user terminal executes the network access operation with the WiFi network AP through the signaling transmission tunnel without performing the intra-network handover, and thus time required by the handover process is saved and network handover efficiency is increased.

III. The Tunnel Destination Address is an IP Address of a Signaling Forwarding Entity.

Figure 5:
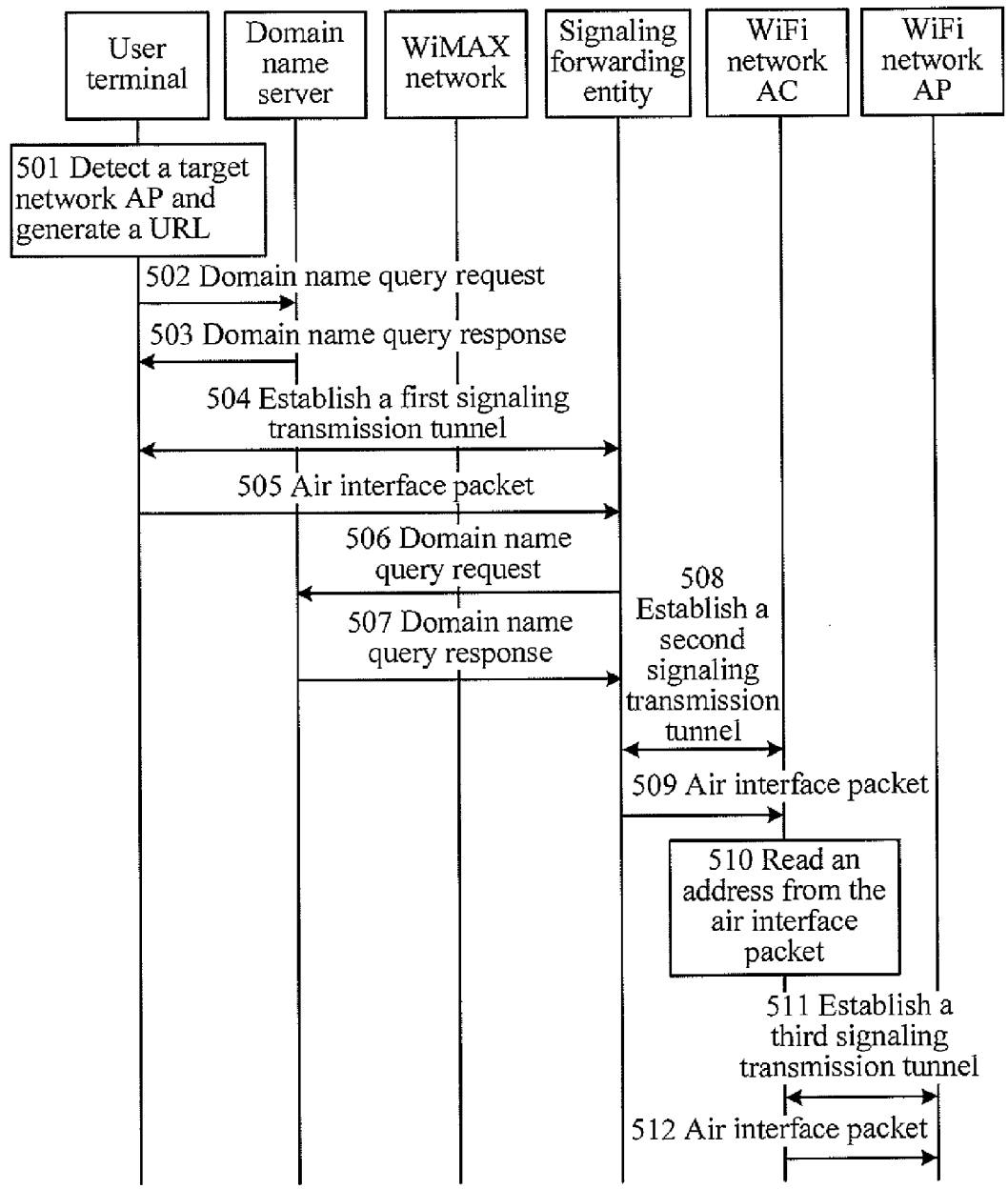
FIG. 5 is a schematic view of network handover according to another embodiment of the present invention.

Referring to FIG. 5, a network handover method according to another embodiment of the present invention includes the following steps.

Steps 501 and 502 are the same as steps 301 and 302 in the forgoing embodiment, and the description thereof is not specifically described here.

In step 503, a domain name server returns a domain name query response to a user terminal.

After receiving a domain name query request sent by the user terminal, the domain name server reads a URL from the domain name query request and sends an IP address corresponding to the URL to the terminal in a response message.

In this embodiment, it is assumed that the user terminal cannot address a WiFi network AC and a WiFi network AP directly, so that a dedicated signaling forwarding entity addressable for the user terminal is deployed on a public network. The user terminal queries that the IP address corresponding to the URL is an IP address of a signaling forwarding entity through a domain name resolution protocol.

In step 504, the user terminal establishes a first signaling transmission tunnel with the signaling forwarding entity.

After receiving the IP address of the signaling forwarding entity returned by the domain name server, the user terminal establishes the first signaling transmission tunnel with the signaling forwarding entity through the WiMAX network according to the IP address serving as a tunnel destination address.

In this embodiment, after a starting point and a destination of the tunnel are determined, a procedure of establishing the signaling transmission tunnel is general knowledge for persons skilled in the art the description of which is not specifically described here.

In step 505, the user terminal sends an air interface packet to the WiFi network AP.

After completing establishing the first signaling transmission tunnel, the user terminal sends the air interface packet to the WiFi network AP through the first signaling transmission tunnel. In this embodiment, the air interface packet is specifically an IEEE 802.11MAC frame. The air interface packet includes the MAC address of the WiFi network AP and the MAC address is acquired by the user terminal when the WiFi network AP is detected in step 501.

In steps 506 and 507, the signaling forwarding entity queries a second tunnel destination address.

After receiving the air interface packet sent by the user terminal, the signaling forwarding entity reads the MAC address of the WiFi network AP from the air interface packet. If the tunnel from the signaling forwarding entity to the WiFi network is not established, the signaling forwarding entity queries the second tunnel destination address from a locally preset mapping table according to the MAC address of the WiFi network AP or generates a URL according to the MAC address of the WiFi network AP and then queries and acquires the corresponding second tunnel destination address through the domain name resolution protocol.

The specific procedure of using the domain name resolution protocol is quite similar to the method for acquiring the tunnel destination address by using the domain name resolution protocol by the user terminal, the description of which is not repeated here.

In step 508, the signaling forwarding entity establishes a second signaling transmission tunnel with the WiFi network.

After the signaling forwarding entity acquires the second tunnel destination address, if the signaling forwarding entity does not have the second signaling transmission tunnel with the WiFi network, the signaling forwarding entity establishes the second signaling transmission tunnel with the WiFi network.

For a common WiFi network networking mode of WiFi network fit APs plus the WiFi network AC, if the WiFi network fit AP has an IP address addressable for the signaling forwarding entity, the second tunnel destination address found by the signaling forwarding entity may be the IP address of the WiFi network fit AP; otherwise, the second tunnel destination address found by the signaling forwarding entity is the IP address of the WiFi network AC where the WiFi network fit AP is located.

For a WiFi network networking mode of WiFi network fat APs, the WiFi network fat AP has an addressable IP address, so that the second tunnel destination address found by the signaling forwarding entity is the IP address of the WiFi network fat AP.

In this embodiment, the WiFi network fit AP refers to the WiFi network AP having AP functions only. In order to control the WiFi network fit APs in a centralized mode, the WiFi network AC needs to be deployed in the WiFi network.

The WiFi network fat AP refers to the WiFi network AP integrating controller functions. For the WiFi network AP, during network layout, the WiFi network AC does not need to be additionally added.

If one signaling forwarding entity only provides services for fixed and limited WiFi networks, the second signaling transmission tunnel from the signaling forwarding entity to the WiFi network AC or the WiFi network fat AP may be statically established. In this embodiment, steps 506 to 508 are not executed, that is, the signaling forwarding entity does not need to establish the second signaling transmission tunnel.

In step 509, the signaling forwarding entity forwards the air interface packet.

After establishing the tunnel with the WiFi network, the signaling forwarding entity starts to forward the air interface packet between the terminal and the WiFi network AP.

After removing a tunnel header from the air interface packet received from the first signaling transmission tunnel, the signaling forwarding entity determines the second signaling transmission tunnel according to the MAC address of the WiFi network AP in the MAC frame header, adds a header of the second signaling transmission tunnel, and sends the air interface packet through the second signaling transmission tunnel.

On the contrary, after receiving the air interface packet from the second signaling transmission tunnel, the signaling forwarding entity removes the tunnel header, determines the first signaling transmission tunnel according to the MAC address of the user terminal in the MAC frame header, adds a header of the first signaling transmission tunnel, and sends the air interface packet through the first signaling transmission tunnel.

In steps 510 to 512, the WiFi network AC establishes a third signaling transmission tunnel with the WiFi network AP and forwards the air interface packet.

If the target WiFi network is in the situation of the WiFi network fit APs plus the WiFi network AC and the second tunnel destination address found by the signaling forwarding entity is the IP address of the WiFi network AC, the second signaling transmission tunnel is located between the signaling forwarding entity and the WiFi network AC, so that the WiFi network AC still needs to establish the third signaling transmission tunnel between the WiFi network AC and the WiFi network AP. The procedure is the same as steps 406 to 408 in the forgoing embodiment, the description of which is not specifically described here.

Similarly, as the amount of the APs in a WiFi network is limited and relatively fixed, the third signaling transmission tunnel may be statically established. In this embodiment, steps 510 to 512 may not be executed, that is, the WiFi network AC does not need to establish the third signaling transmission tunnel with the WiFi network AP.

It should be noted that in this embodiment, in steps 506 and 507, for a WiFi network networking mode of the WiFi network fit APs plus the WiFi network AC, if the WiFi network fit AP has the IP address directly addressable for the signaling forwarding entity, the second tunnel destination address queried by the signaling forwarding entity may be the IP address of the WiFi network fit AP and the signaling forwarding entity practically establishes the second signaling transmission tunnel with the WiFi network fit AP directly. In the situation, only a routing function of the WiFi network AC is used and the procedure of establishing the tunnel between the WiFi network AC and the WiFi network AP is not needed.

In this embodiment, in steps 506 and 507, for the WiFi network networking mode of the WiFi network fat APs, if the WiFi network fat AP has the IP address directly addressable for the signaling forwarding entity, the second tunnel destination address queried by the signaling forwarding entity may be the IP address of the WiFi network fat AP. As the WiFi network fat AP integrates the controller function, the WiFi network does not have the WiFi network AC and the signaling forwarding entity practically establishes the second signaling transmission tunnel with the WiFi network fat AP directly without passing through the WiFi network AC.

In this embodiment, as the signaling forwarding entity is configured with an addressable IP address, the tunnel destination address queried by the terminal is the IP address of the signaling forwarding entity. The user terminal establishes the first signaling transmission tunnel with the signaling forwarding entity and the signaling forwarding entity establishes the second signaling transmission tunnel with the WiFi network AC or AP. For details, please refer to FIG. 2.

In this embodiment, the terminal establishes the IP tunnel 203 with the signaling forwarding entity. Here, a path from the signaling forwarding entity to the WiFi network AP may be two tunnels 205 and 204 established between the WiFi network AC and the signaling forwarding entity and between the WiFi network AC and the WiFi network AP respectively or may also be the tunnel directly established between the signaling forwarding entity and the WiFi network AP, that is, the WiFi network AC only has the routing function. When the WiFi network AC establishes the tunnel with the signaling forwarding entity and the WiFi network AP respectively, the WiFi network AC needs to implement the MAC frame proxy function. After receiving the IP packet with the encapsulated with the 802.11MAC frame, the signaling forwarding entity reads the MAC frame and encapsulates the MAC frame in the tunnel of the WiFi network AC or the WiFi network AP for subsequent transmission, and vice versa.

In this embodiment, as the tunnel destination address acquired by the user terminal from the domain name server is the IP address of the signaling forwarding entity, the user terminal may establish the first signaling transmission tunnel with the signaling forwarding entity and the signaling forwarding entity may establish the second signaling transmission tunnel with the WiFi network AP or use the statically established second signaling transmission tunnel, so that the user terminal may execute the network access operation with the WiFi network AP through the first signaling transmission tunnel and the second signaling transmission tunnel. Alternatively, the user terminal may establish the first signaling transmission tunnel with the signaling forwarding entity, the signaling forwarding entity may establish the second signaling transmission tunnel with the WiFi network AC or use the statically established second signaling transmission tunnel, and the WiFi network AC establishes the third signaling transmission tunnel with the WiFi network AP or uses the statically established third signaling transmission tunnel, so that the user terminal may execute the network access operation with the WiFi network AP through the first signaling transmission tunnel, the second signaling transmission tunnel, and the third signaling transmission tunnel. Therefore, the user terminal does not need to enter the network through a virtual AP and then perform intra-network handover, so that for the network that does not support a roaming function, for example, the WiFi network, the handover between the WiFi network and the WiMAX network can be implemented.

Next, in the embodiment of the present invention, the user terminal executes the network access operation with the WiFi network AP through the signaling transmission tunnel without performing the intra-network handover, and thus time required by the handover process is saved and network handover efficiency is increased.

Next, in this embodiment, the WiFi network does not need to configure the IP address addressable for the public network for the WiFi network AP and at the same time the terminal does not need to know the IP address of the WiFi network AC, so that the user terminal only needs to acquire the IP address of the signaling forwarding entity and then interacts with the signaling forwarding entity. The subsequent routing of the MAC frame after reaching the WiFi network AP is processed by the signaling forwarding entity, that is, the subsequent network.

During the practical application, the described solution in which the user terminal directly establishes the signaling transmission tunnel with the WiFi network AP, the solution in which the user terminal firstly establishes the signaling transmission tunnel with the WiFi network AC, and the solution in which the user terminal firstly establishes the signaling transmission tunnel with the signaling forwarding entity may exist at the same time. When the network configures the relation list between the URL and the IP address generated by the MAC address or the identification information of the WiFi network AP in the domain name server or a used data base, the IP address corresponding to the URL can be set to the IP address of the WiFi network AP, the IP address of the WiFi network AC, or the IP address of the signaling forwarding entity according to practical situations.

For the user terminal, the user terminal does not need to know which NE the IP address found through the domain name resolution protocol belongs to and only needs to directly establish the signaling transmission tunnel and send the air interface packet to the WiFi network AP through the signaling transmission tunnel. If the network entity with which the user terminal establishes the signaling transmission tunnel is not the WiFi network AP, according to the MAC address or the identification information of the WiFi network AP in the air interface packet, the tunnel destination address of the next signaling transmission tunnel is queried by using the address resolution protocol, the signaling transmission tunnel is established with the tunnel destination address, and then the air interface packet received from the user terminal continues to be sent in the signaling transmission tunnel.

It can be seen that a plurality of signaling forwarding entities exists in a path from the user terminal to the WiFi network AP and each signaling forwarding entity establishes a next signaling transmission tunnel by using the same technology. Before establishing the signaling transmission tunnel with the WiFi network AP, the WiFi network AC does not need to use the address resolution protocol. The reason is that the WiFi network AC knows whether the WiFi network AP indicated by the MAC address or the identification information of the WiFi network AP in the air interface packet is in the network managed by the WiFi network AC.

It should be noted that the URL generated by the signaling forwarding entity according to the MAC address or the identification information of the WiFi network AP may be different from the URL generated by the user terminal according to the MAC address or the identification information of the WiFi network AP. Alternatively, the user terminal and the signaling forwarding entity use different domain name resolution servers, so as to acquire the IP address of the next tunnel destination instead of the IP address of the same NE when the second tunnel destination address is queried through the domain name resolution protocol.

In addition, the mode that the user terminal and the signaling forwarding entity find the tunnel destination IP address by using the domain name resolution protocol is only an optional solution in the practical application. Practically, the user terminal or the signaling forwarding entity may query the tunnel destination IP address by using other protocols, for example, the method described in the foregoing embodiments in which the local query data list is established in the signaling forwarding entity, the detailed description of which is not specifically described here.

It should be noted in the embodiment, in addition to that the signaling transmission tunnel having the user terminal as the starting point needs to be dynamically established, other various signaling transmission tunnels may be dynamically established according to the described content or statically pre-established.

Figure 6:
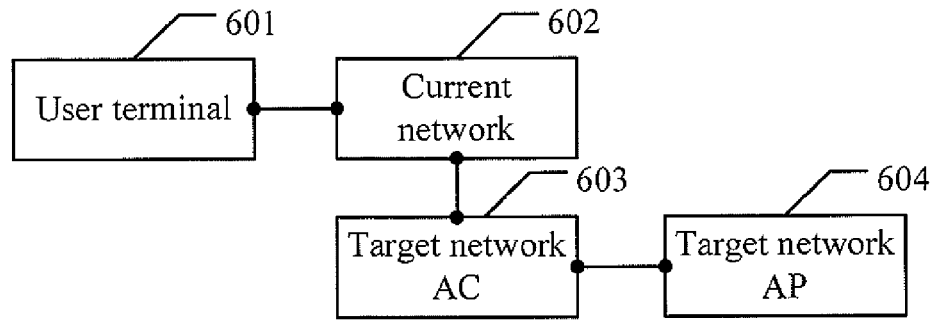
FIG. 6 is a schematic view of a communications system according to an embodiment of the present invention.

In the following, a communications system according to an embodiment of the present invention is described. Referring to FIG. 6, the communication system according to the embodiment of the present invention includes a current network 602 and a target network AP 604.

The current network 602 is configured to assist to establish a signaling transmission tunnel.

The target network AP 604 is configured to establish the signaling transmission tunnel with a user terminal and execute a network access operation with the user terminal through the signaling transmission tunnel.

The communications system in this embodiment further includes a user terminal 601.

The user terminal 601 is configured to determine the target network AP 604, acquire an IP address of the target network AP 604, establish the signaling transmission tunnel with the target network AP 604 through the current network 602 according to the IP address of the target network AP 604, and execute the network access operation with the target network AP 604 through the signaling transmission tunnel.

It should be noted that if the target network AP 604 in this embodiment integrates a controller function, a target network may not have a target network AC 603, so that the user terminal 601 establishes the signaling transmission tunnel with the target network AP 604 directly without passing through the target network AC 603. If the target network AP 604 in this embodiment does not have the controller function, the target network has the target network AC 603. The user terminal 601 needs to establish the signaling transmission tunnel with the target network AP 604 through the target network AC 603. The target network AC 603 only has a transparent transmission function.

In the communications system in this embodiment, the user terminal 601 acquires the IP address of the target network AP 604 as the tunnel destination address and establishes the signaling transmission tunnel with the target network AP 604 directly. A specific procedure of establishing the tunnel and a network access procedure are consistent with the description in the embodiment of FIG. 3, the description of which is not specifically described here.

In this embodiment, the tunnel destination address acquired by the user terminal 601 from the domain name server is the IP address of the target network AP 604, so that the user terminal 601 establishes the signaling transmission tunnel with the target network AP 604 and executes the network access operation with the target network AP 604 through the signaling transmission tunnel. Therefore, the user terminal 601 does not need to enter the network through a virtual AP and then perform intra-network handover, so that for the network that does not support a roaming function, for example, the WiFi network, the handover between the WiFi network and the WiMAX network can be implemented.

Next, in the embodiment of the present invention, the user terminal 601 executes the network access operation with the target network AP 604 through the signaling transmission tunnel without performing the intra-network handover, and thus time required by the handover process is saved and network handover efficiency is increased.

In the following, a communications system according to an embodiment of the present invention is introduced. Referring to FIG. 6, the communications system according to another embodiment of the present invention includes a target network AC 603, a current network 602, and a target network AP 604.

The target network AC 603 is configured to establish a first signaling transmission tunnel with a user terminal and determine an existing second signaling transmission tunnel with the target network AP 604 or establish a second signaling transmission tunnel with the target network AP 604.

It should be noted that a specific procedure of determining the existing second signaling transmission tunnel between the target network AC 603 and the target network AP 604 in this embodiment is general knowledge for persons skilled in the art, which is not specifically described here.

The current network 602 is configured to assist in establishing the first signaling transmission tunnel.

The target network AP 604 is configured to execute a network access operation with the user terminal through the first signaling transmission tunnel and the second signaling transmission tunnel.

The communications system in this embodiment further includes a user terminal 601.

The user terminal 601 is configured to determine the target network AP 604, acquire an IP address of the target network AC 603, establish the first signaling transmission tunnel with the target network AC 603 through the current network 602 according to the IP address of the target network AC 603, and execute the network access operation with the target network AP 604 through the first signaling transmission tunnel and the target network AC 603.

In the communications system in this embodiment, the user terminal 601 acquires the IP address of the target network AC 603 as the tunnel destination address and establishes the first signaling transmission tunnel with the target network AC 603 directly. The target network AC 603 establishes the second signaling transmission tunnel with the target network AP 604 or uses the statically established second signaling transmission tunnel. A specific procedure of establishing the tunnel and a network access procedure are consistent with the content described in the embodiment as shown in FIG. 4, the description of which is not specifically described here.

In this embodiment, the tunnel destination address acquired by the user terminal 601 from the domain name server is the IP address of the target network AC 603, so that the user terminal establishes the first signaling transmission tunnel with the target network AC 603 and the target network AC 603 establishes the second signaling transmission tunnel with the target network AP 604 or uses the statically established second signaling transmission tunnel. Therefore, the user terminal 601 executes the network access operation with the target network AP 604 through the first signaling transmission tunnel and the second signaling transmission tunnel, so that the user terminal 601 does not need to firstly establish a tunnel with a virtual AP and then perform intra-network handover, so that for the network that does not support a roaming function, for example, the WiFi network, the handover between the WiFi network and the WiMAX network can be implemented.

Next, in the embodiment of the present invention, the user terminal 601 directly executes the network access operation with the target network AP 604 through the signaling transmission tunnel without performing the intra-network handover, and thus time required by the handover process is saved and network handover efficiency is increased.

Figure 7:
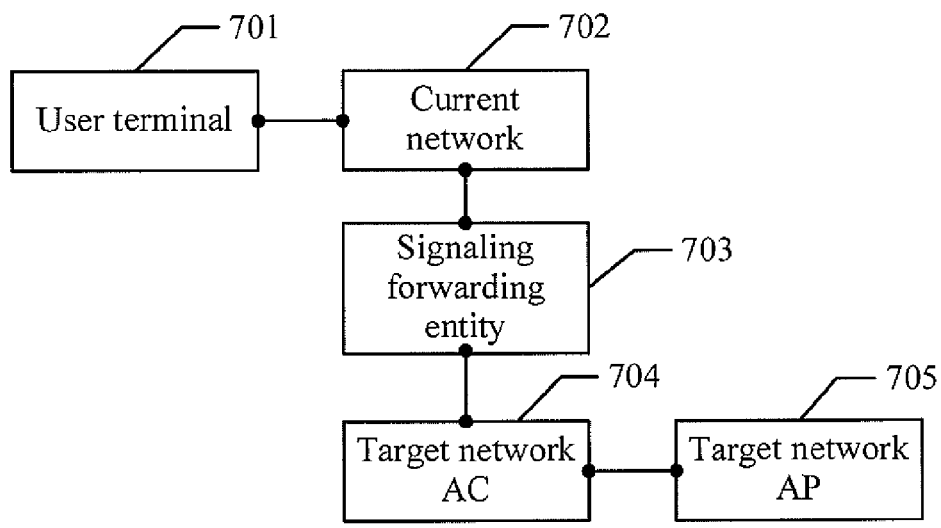
FIG. 7 is a schematic view of a communications system according to another embodiment of the present invention.

In the following, a communications system according to an embodiment of the present invention is described. Referring to FIG. 7, the communications system according to another embodiment of the present invention includes a signaling forwarding entity 703, a current network 702, and a target network AP 705.

The signaling forwarding entity 703 is configured to establish a first signaling transmission tunnel with a user terminal and determine an existing second signaling transmission tunnel with the target network AP 705 or establish a second signaling transmission tunnel with the target network AP 705.

It should be noted that a specific procedure of determining the existing second signaling transmission tunnel between the signaling forwarding entity 703 and the target network AP 705 in this embodiment is general knowledge for persons skilled in the art, which is not specifically described here.

The current network 702 is configured to assist to establish the first signaling transmission tunnel.

The target network AP 705 is configured to execute a network access operation with the user terminal through the first signaling transmission tunnel and the second signaling transmission tunnel.

The communications system in this embodiment further includes a user terminal 701.

The user terminal 701 is configured to determine the target network AP 705, acquire an IP address of the signaling forwarding entity 703, establish the first signaling transmission tunnel with the signaling forwarding entity 703 through the current network 702 according to the IP address of the signaling forwarding entity 703, and execute the network access operation with the target network AP 705 through the first signaling transmission tunnel and the signaling forwarding entity 703.

It should be noted that if the target network AP 705 in this embodiment integrates a controller function, a target network may not have a target network AC 704, so that the signaling forwarding entity 703 directly establishes the signaling transmission tunnel with the target network AP 705 without passing through the target network AC 704. If the target network AP 705 in this embodiment does not have the controller function, the target network has the target network AC 704. The signaling forwarding entity 703 needs to establish the signaling transmission tunnel with the target network AP 705 through the target network AC 704 and the target network AC 704 only has a transparent transmission function.

In the communications system in this embodiment, the user terminal 701 acquires the IP address of the signaling forwarding entity 703 as the tunnel destination address and establishes the first signaling transmission tunnel with the signaling forwarding entity 703 directly and the signaling forwarding entity 703 establishes the second signaling transmission tunnel with the target network AP 705 through the target network AC 704 or uses the statically established second signaling transmission tunnel. A specific tunnel establishment procedure and network access procedure are consistent with the description in the embodiment of FIG. 5, the description of which is not specifically described here.

In the following, a communications system according to an embodiment of the present invention is described. Referring to FIG. 7, the communications system according to another embodiment of the present invention includes a signaling forwarding entity 703, a target network AC 704, a current network 702, and a target network AP 705.

The signaling forwarding entity 703 is configured to establish a first signaling transmission tunnel with a user terminal and determine an existing second signaling transmission tunnel with the target network AC 704 or establish a second signaling transmission tunnel with the target network AC 704.

The target network AC 704 is configured to establish the second signaling transmission tunnel with the signaling forwarding entity 703 and determine an existing third signaling transmission tunnel with the target network AP 705 or establish a third signaling transmission tunnel with the target network AP 705.

It should be noted that a specific procedure of determining the existing second signaling transmission tunnel between the signal forwarding entity 703 and the target network AC 704 and a procedure of determining the existing third signaling transmission tunnel between the target network AC 704 and the target network AP 705 in this embodiment are general knowledge for persons skilled in the art, which is not specifically described here.

The current network 702 is configured to assist in establishing the first signaling transmission tunnel.

The target network AP 705 is configured to execute a network access operation with the user terminal through the first signaling transmission tunnel, the second signaling transmission tunnel, and the third signaling transmission tunnel.

The communication system in this embodiment further includes a user terminal 701.

The user terminal 701 is configured to determine the target network AP 705, acquire an IP address of the signaling forwarding entity 703, establish the first signaling transmission tunnel with the signaling forwarding entity 703 through the current network 702 according to the signaling forwarding entity 703, and execute the network access operation with the target network AP 705 through the first signaling transmission tunnel and the signaling forwarding entity 703.

In this embodiment, as the tunnel destination address acquired by the user terminal 701 from the domain name server is the IP address of the signaling forwarding entity 703, the user terminal 701 may establish the first signaling transmission tunnel with the signaling forwarding entity 703 and the signaling forwarding entity 703 establishes the second signaling transmission tunnel with the target network AC 704 or the target network AP 705 or uses the statically established second signaling transmission tunnel, so that the user terminal 701 executes the network access operation with the target network AP 705 through the first signaling transmission tunnel and the second signaling transmission tunnel. Therefore, the user terminal 701 does not need to establish a tunnel with a virtual AP and then perform intra-network handover, so that for the network that does not support a roaming function, for example, the WiFi network, the handover between the WiFi network and the WiMAX network can be implemented.

Next, in the embodiment of the present invention, the user terminal 701 executes the network access operation with the target network AP 705 through the signaling transmission tunnel without performing the intra-network handover, and thus time required by the handover process is saved and network handover efficiency is increased.

Figure 8:
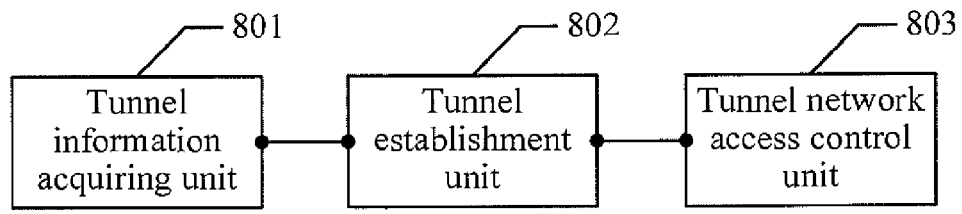
FIG. 8 is a schematic view of a user terminal according to an embodiment of the present invention.

In the following, a user terminal according to an embodiment of the present invention is described. Referring to FIG. 8, the user terminal according to the embodiment of the present invention includes a tunnel information acquiring unit 801, a tunnel establishment unit 802, and a tunnel network access control unit 803.

The tunnel information acquiring unit 801 is configured to acquire a tunnel destination address according to a target network AP.

The tunnel establishment unit 802 is configured to establish a signaling transmission tunnel with an NE corresponding to the tunnel destination address through a current network according to the tunnel destination address.

The tunnel network access control unit 803 is configured to execute a network access operation with the target network AP through the signaling transmission tunnel.

The signaling transmission tunnel established by the tunnel establishment unit 802 in this embodiment is a tunnel from the user terminal to the NE corresponding to the tunnel destination address.

If the tunnel destination address is the address of the target network AC, the tunnel may be the first signaling transmission tunnel between the user terminal and the target network AC in the embodiment as shown in FIG. 4.

If the tunnel destination address is the address of the signaling forwarding entity, the tunnel may be the first signaling transmission tunnel between the user terminal and the signaling forwarding entity in the embodiment as shown in FIG. 5.

If the tunnel destination address is the address of the target network AP, the tunnel may be the direct signaling transmission tunnel between the user terminal and the target network AP in the embodiment as shown in FIG. 3.

It should be noted that if the tunnel destination address is not the address of the target network AP, in this embodiment, when the tunnel network access control unit 803 executes the network access operation with the target network AP, in addition to passing through the signaling transmission tunnel with the NE corresponding to the tunnel destination address, the tunnel network access control unit 803 may need to pass through other tunnels.

When the tunnel destination address is the address of the target network AC and when the tunnel network access control unit 803 executes the network access operation with the target network AP, in addition to passing through the signaling transmission tunnel established by the tunnel establishment unit 802, the tunnel network access control unit 803 further needs to pass through the second signaling transmission tunnel between the target network AC and the target network AP (specifically as described in the embodiment as shown in FIG. 4).

When the tunnel destination address is the address of the signaling forwarding entity and when the tunnel network access control unit 803 executes the network access operation with the target network AP, in addition to passing through the signaling transmission tunnel established by the tunnel establishment unit 802, the tunnel network access control unit 803 further needs to pass through the second signaling transmission tunnel between the signaling forwarding entity and the target network AP or further needs to pass through the second signaling transmission tunnel between the through signaling forwarding entity and the target network AC and the third signaling transmission tunnel between the target network AC and the target network AP (specifically as described in the embodiment as shown in FIG. 5).

In the embodiment of the present invention, as the tunnel establishment unit 802 may pass through the signaling transmission tunnel established between the current network and the NE corresponding to the tunnel destination address and the tunnel network access control unit 803 can execute the network access operation with the target network AP through the signaling transmission tunnel, the user terminal does not need to establish a tunnel with a virtual AP and then perform intra-network handover, so that for the network that does not support a roaming function, for example, the WiFi network, the handover between the WiFi network and the WiMAX network can be implemented.

Next, in the embodiment of the present invention, the tunnel network access control unit 803 executes the network access operation with the target network AP through the signaling transmission tunnel without performing the intra-network handover, thereby saving time required by the handover process and increasing network handover efficiency.

Figure 9:
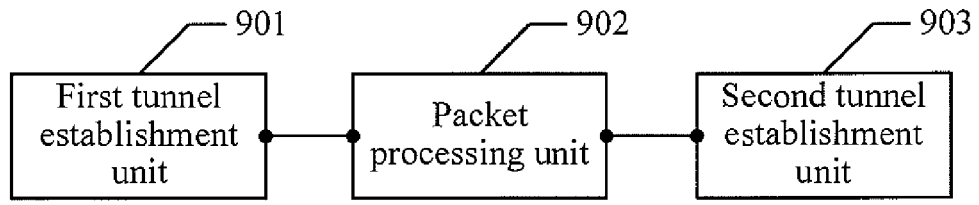
FIG. 9 is a schematic view of a network AC according to an embodiment of the present invention.

In the following, a network AC according to an embodiment the present invention is described. Referring to FIG. 9, the network AC according to the embodiment of the present invention includes a first tunnel establishment unit 901, a packet processing unit 902, and a second tunnel establishment unit 903.

The first tunnel establishment unit 901 is configured to establish a first signaling transmission tunnel with a user terminal.

The packet processing unit 902 is configured to receive an air interface packet carrying an MAC address of a target network AP sent by the user terminal and forward the air interface packet between the first signaling transmission tunnel and a second signaling transmission tunnel.

The forwarding described here refers to that a tunnel header is removed from a received tunnel packet, a header of another tunnel is encapsulated, and then the packet is sent. The procedure is general knowledge for persons skilled in the art, the detailed description of which is not specifically described here.

The second tunnel establishment unit 903 is configured to determine an existing second signaling transmission tunnel with the target network AP or establish a second signaling transmission tunnel with the target network AP according to the MAC address of the target network AP.

It should be noted that a specific procedure of determining the existing second signaling transmission tunnel between the second tunnel establishment unit 903 and the target network AP in this embodiment is general knowledge for persons skilled in the art, which is not specifically described here.

A procedure of establishing the first signaling transmission tunnel by the first tunnel establishment unit 901 and a procedure of establishing the second signaling transmission tunnel by the second tunnel establishment unit 903 in this embodiment are consistent with the procedure of establishing the signaling transmission tunnel in the embodiment as shown in FIG. 4, the description of which is not specifically described here.

As the first tunnel establishment unit 901 in the network AC in this embodiment may establish the first signaling transmission tunnel with the user terminal and the second tunnel establishment unit 903 may establish the second signaling transmission tunnel with the target network AP or use the statically established second signaling transmission tunnel, the user terminal may execute the network access operation with the target network AP through the first signaling transmission tunnel and the second signaling transmission tunnel, so that the user terminal does not need to establish a tunnel with a virtual AP and perform intra-network handover, so that for the network that does not support a roaming function, for example, the WiFi network, the handover between the WiFi network and the WiMAX network can be implemented.

Next, the user terminal executes the network access operation with the target network AP through the first signaling transmission tunnel and the second signaling transmission tunnel without performing the intra-network handover, thereby saving time required by the handover process and increasing network handover efficiency.

Figure 10:
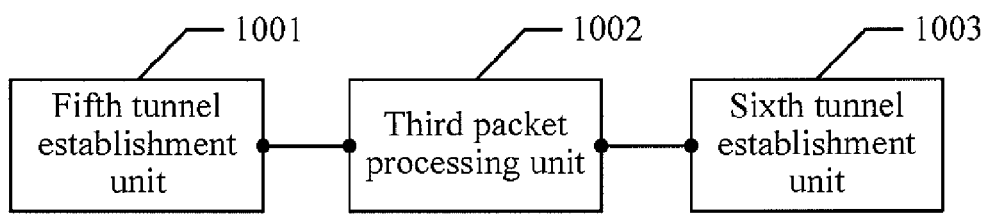
FIG. 10 is a schematic view of a network AC according to another embodiment of the present invention.

In the following, a network AC according to an embodiment of the present invention is described. Referring to FIG. 10, the network AC according to another embodiment of the present invention includes a fifth tunnel establishment unit 1001, a third packet processing unit 1002, and a sixth tunnel establishment unit 1003.

The fifth tunnel establishment unit 1001 is configured to determine an existing second signaling transmission tunnel with a signaling forwarding entity or establish a second signaling transmission tunnel with the signaling forwarding entity.

The third packet processing unit 1002 is configured to receive an air interface packet carrying an MAC address of a target network AP and forward the air interface packet between the second signaling transmission tunnel and a third signaling transmission tunnel.

The sixth tunnel establishment unit 1003 is configured to determine an existing third signaling transmission tunnel with the target network AP or establish the third signaling transmission tunnel with the target network AP according to the MAC address of the target network AP.

It should be noted that a specific procedure of determining the existing second signaling transmission tunnel between the fifth tunnel establishment unit 1001 and the signaling forwarding entity and a procedure of determining the existing third signaling transmission tunnel between the sixth tunnel establishment unit 1003 and the target network AP in this embodiment are general knowledge for persons skilled in the art, which is not specifically described here.

In the network AC in this embodiment, the fifth tunnel establishment unit 1001 establishes the second signaling transmission tunnel with the signaling forwarding entity or uses the statically established second signaling transmission tunnel and the sixth tunnel establishment unit 1003 establishes the third signaling transmission tunnel with the target network AP or uses the statically established third signaling transmission tunnel, so that the user terminal may execute the network access operation with the target network AP through the signaling forwarding entity, the second signaling transmission tunnel, and the third signaling transmission tunnel and the user terminal does not need to establish a tunnel with a virtual AP and then perform intra-network handover, so that for the network that does not support a roaming function, for example, the WiFi network, the handover between the WiFi network and the wiMAX network can be implemented.

Figure 11:
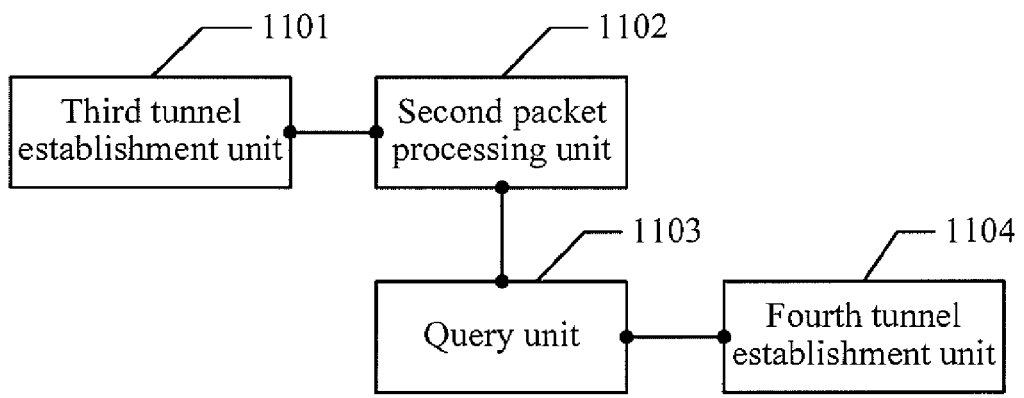
FIG. 11 is a schematic view of a signaling forwarding entity according to an embodiment of the present invention.

In the following, a signaling forwarding entity according to an embodiment of the present invention is described. Referring to FIG. 11, the signaling forwarding entity according to the embodiment of the present invention includes a third tunnel establishment unit 1101, a second packet processing unit 1102, and a fourth tunnel establishment unit 1104.

The third tunnel establishment unit 1101 is configured to establish a first signaling transmission tunnel with a user terminal.

The second packet processing unit 1102 is configured to receive an air interface packet carrying an MAC address of a target network AP sent by the user terminal and forward the air interface packet between the first signaling transmission tunnel and a second signaling transmission tunnel.

The fourth tunnel establishment unit 1104 is configured to determine an existing second signaling transmission tunnel with the target network AP or a target network AC or establish the second signaling transmission tunnel with the target network AP or the target network AC.

It should be noted that a specific procedure of determining the existing second signaling transmission tunnel between the fourth tunnel establishment unit 1104 and the target network AP or the target network AC in this embodiment is general knowledge for persons skilled in the art, which is not specifically described here.

The signaling forwarding entity in this embodiment further includes a query unit 1103.

The query unit 1103 is configured to query a second tunnel destination address from the domain name server according to the MAC address of the target network AP acquired by the second packet processing unit 1102.

The fourth tunnel establishment unit 1104 establishes the second signaling transmission tunnel with the target network AP or the target network AC according to the second tunnel destination address queried by the query unit 1103.

A procedure of establishing the first signaling transmission tunnel by the third tunnel establishment unit 1101 and a procedure of establishing the second signaling transmission tunnel by the fourth tunnel establishment unit 1104 are consistent with the procedure of establishing the signaling transmission tunnel in the embodiment as shown in FIG. 5, the description of which is not specifically described here.

In this embodiment, as the third tunnel establishment unit 1101 in the signaling forwarding entity may establish the first signaling transmission tunnel with the user terminal and the fourth tunnel establishment unit 1104 establishes the second signaling transmission tunnel with the target network AP or the target network AC or uses the statically established second signaling transmission tunnel, the user terminal may execute the network access operation with the target network AP through the first signaling transmission tunnel and the second signaling transmission tunnel and the user terminal does not need to establish a tunnel with a virtual AP and then perform intra-network handover, so that for the network that does not support a roaming function, for example, the WiFi network, the handover between the WiFi network and the WiMAX network can be implemented.

Next, the user terminal executes the network access operation with the target network AP through the first signaling transmission tunnel and the second signaling transmission tunnel without performing the intra-network handover, thereby saving time required by the handover process and increasing network handover efficiency.

Figure 12:
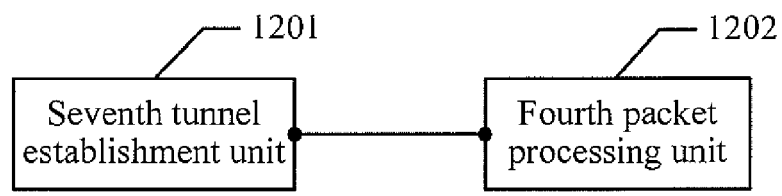
FIG. 12 is a schematic view of a network AP according to an embodiment of the present invention.

In the following, a network AP according to an embodiment of the present invention is described. Referring to FIG. 12, the network AP according to the embodiment of the present invention includes a seventh tunnel establishment unit 1201 and a fourth packet processing unit 1202.

The seventh tunnel establishment unit 1201 is configured to establish a signaling transmission tunnel with a user terminal or a target network AC or a signaling forwarding entity.

The fourth packet processing unit 1202 is configured to receive an air interface packet sent by the user terminal through the signaling transmission tunnel established by the seventh tunnel establishment unit 1201 and send the air interface packet to the user terminal through the signaling transmission tunnel established by the seventh tunnel establishment unit 1201.

It should be noted that in this embodiment, the seventh tunnel establishment unit 1201 may establish a direct signaling transmission tunnel with the user terminal (specifically as described in the embodiment as shown in FIG. 3).

Alternatively, as described in the embodiment as shown in FIG. 4, the seventh tunnel establishment unit 1201 may establish the second signaling transmission tunnel with the target network AC.

Alternatively, as described in the embodiment as shown in FIG. 5, the seventh tunnel establishment unit 1201 may establish the second signaling transmission tunnel with the signaling forwarding entity or the third signaling transmission tunnel with the target network AC.

The fourth packet processing unit 1202 receives the air interface packet sent by the user terminal from the signaling transmission tunnel established by the seventh tunnel establishment unit 1201 and forwards the air interface packet to an air interface packet processing module for processing. At the same time, the fourth packet processing unit 1202 further sends the air interface packet to the user terminal through the signaling transmission tunnel established by the seventh tunnel establishment unit 1201.

In this embodiment, the seventh tunnel establishment unit 1201 of the network AP establishes the signaling transmission tunnel with the user terminal or the signaling forwarding entity or the target network AC, so that the user terminal may execute the network access operation with the target network AP and does not need to establish a tunnel with a virtual AP and then perform intra-network handover, so that for the network that does not support a roaming function, for example, the WiFi network, the handover between the WiFi network and the WiMAX network can be implemented.

Persons of ordinary skill in the art may understand that all or part of the steps of the method according to the embodiments of the present invention may be implemented by a program instructing relevant hardware. The program may be stored in a computer readable storage medium. The storage medium may be a magnetic disk, a compact disk read-only memory (CD-ROM), or a read-only memory (ROM).

The network handover method, the communications system, and the relevant devices according to the present invention are described in detail. Person having ordinary skill in the art can make variations and modifications to the present invention in terms of the specific implementations and application scopes according to the ideas of the present invention. Therefore, the specification shall not be construed as limitations to the present invention.

What is claimed is:

1. A method performed by a user terminal for handover of wireless communications from a current wireless network to a target wireless network, the method comprising:
    identifying a target wireless access point (AP) on the target wireless network, and acquiring a tunnel destination address according to an identity of the target wireless AP, wherein the tunnel destination address is an Internet Protocol (IP) address of a signaling forwarding entity;
    establishing a tunnel according to the tunnel destination address for transmitting network communication data between the user terminal and the target wireless AP through the current wireless network, wherein the tunnel comprises a first signaling transmission tunnel through the current wireless network established by the user terminal with the signaling forwarding entity, a second signaling transmission tunnel between the signaling forwarding entity and a target network acess controller (AC) of the target wireless network, and a third signaling transmission tunnel between the target network AC and the target wireless AP,;
    executing a network access operation with the target wireless AP through the tunnel between the user terminal and the target wireless AP to set up wireless access to the target wireless AP; and
    switching to wireless communications with the target wireless AP.

2. The method according to claim 1, wherein the step of acquiring the tunnel destination address comprises:
    sending, by the user terminal, a domain name query request, to a domain name server, wherein the domain name query request carries a media access control (MAC) address or identification information of the target wireless AP; and receiving, by the user terminal, a domain name query response returned by the domain name server, wherein the domain name query response carries the tunnel destination address.

3. The method according to claim 1, wherein the step of executing the network access operation comprises:

sending an air interface packet to the target wireless AP through the tunnel, and receiving an air interface response packet sent by the target wireless AP to the user terminal through the tunnel.

4. A user terminal, comprising:

a processor and a memory coupled to the processor;

wherein the processor is configured to perform operations for handover wireless communications of the user terminal from a current wireless network to a target wireless network, the operations comprising:

identifying a target wireless access point (AP) on the target wireless network, and acquiring a tunnel destination address according to an identity of the target wireless AP, wherein the tunnel destination address is an Internet Protocol (IP) address of a signaling forwarding entity;

establishing a tunnel according to the tunnel destination address for transmitting network communication data between the user terminal and the target wireless AP through the current wireless network, wherein the tunnel comprises a first signaling transmission tunnel through the current wireless network established by the user terminal with the signaling forwarding entity, a second signaling transmission tunnel between the signaling forwarding entity and a target network access controller (AC) of the target wireless network, and a third signaling transmission tunnel between the target network AC and the target wireless AP;

executing a network access operation with the target wireless AP through the tunnel between the user terminal and the target wireless AP to set up wireless access to the target wireless AP; and switching to wireless communications with the target wireless AP.

* * * * *